(12) United States Patent
Wei et al.

(10) Patent No.: US 12,261,436 B2
(45) Date of Patent: Mar. 25, 2025

(54) PRIORITIZATION OF POWER GENERATION IN A POWER PLANT COMPRISING WIND TURBINE GENERATORS

(71) Applicant: VESTAS WIND SYSTEMS A/S, Aarhus N. (DK)

(72) Inventors: Mu Wei, Solbjerg (DK); Mads Rajczyk Skjelmose, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 401 days.

(21) Appl. No.: 17/787,527

(22) PCT Filed: Dec. 16, 2020

(86) PCT No.: PCT/DK2020/050371
§ 371 (c)(1),
(2) Date: Jun. 20, 2022

(87) PCT Pub. No.: WO2021/121511
PCT Pub. Date: Jun. 24, 2021

(65) Prior Publication Data
US 2022/0385065 A1 Dec. 1, 2022

(30) Foreign Application Priority Data
Dec. 20, 2019 (DK) .............. PA 2019 70830

(51) Int. Cl.
*H02J 3/00* (2006.01)
*H02J 3/38* (2006.01)

(52) U.S. Cl.
CPC .............. *H02J 3/004* (2020.01); *H02J 3/001* (2020.01); *H02J 3/003* (2020.01); *H02J 3/381* (2013.01); *H02J 2300/28* (2020.01)

(58) Field of Classification Search
CPC .. H02J 3/004; H02J 3/001; H02J 3/003; H02J 3/381; H02J 2300/28; H02J 2310/18; H02J 3/466; H02J 3/48; Y02E 10/76
See application file for complete search history.

(56) References Cited

U.S. PATENT DOCUMENTS

2011/0301769 A1 12/2011 Lovmand et al.
2014/0103652 A1 4/2014 Ubben et al.
(Continued)

FOREIGN PATENT DOCUMENTS

| WO | 2013167141 A1 | 11/2013 | |
| WO | WO-2018006920 A1 * | 1/2018 | ............. F03D 7/028 |
| WO | 2021121511 A1 | 6/2021 | |

OTHER PUBLICATIONS

Danish Patent and Trademark Office, 1st Technical Examination including The Search Report and Search Report for Application PA 2019 70830 dated May 25, 2020.
(Continued)

*Primary Examiner* — Chad G Erdman
(74) *Attorney, Agent, or Firm* — Patterson + Sheridan, LLP

(57) ABSTRACT

The invention relates to a method for controlling power generation from a power plant which comprises a plurality of power generating units. The method involves setting a maximal allowed power production for each power generating unit in a selection of one or more power generating units of second priority to a non-zero value, where the maximal allowed power production is determined dependent on whether a first power production gap is greater or less than zero and dependent on a comparison of the first power production gap with a second available power production capability of the selection of the one or more power generating units of the second priority.

17 Claims, 3 Drawing Sheets

(56) References Cited

U.S. PATENT DOCUMENTS

| | | |
|---|---|---|
| 2015/0267683 A1 | 9/2015 | Ubben et al. |
| 2015/0303697 A1 | 10/2015 | Ploett |
| 2015/0311722 A1 | 10/2015 | Ham et al. |
| 2017/0321655 A1 | 11/2017 | Moller |
| 2020/0400120 A1* | 12/2020 | Brogan .................... H02J 11/00 |
| 2021/0194252 A1* | 6/2021 | Wang ........................ H02J 3/46 |

OTHER PUBLICATIONS

PCT, Notification of Transmittal of The International Search Report and The Written Opinion of The International Searching Authority, or The Declaration for Application PCT/DK2020/050371 dated Mar. 15, 2021.

* cited by examiner

PRIORITIZATION OF POWER GENERATION IN A POWER PLANT COMPRISING WIND TURBINE GENERATORS

FIELD OF THE INVENTION

The invention relates to control of power plants comprising a plurality of power generating units, particularly power plants which has one or more wind turbines and to determine prioritized power production among the power generating units of the power plant.

BACKGROUND OF THE INVENTION

In a power plant comprising a plurality of power generating units such as wind turbines and possibly photovoltaic solar panels, the operator or owner of the power plant may have specific objectives and preferences for operating power generating units. For example, the owner may have a desire to increase power production of some power generating units while decreasing power production of other power generating units, e.g. in order to prolong the lifetime or service interval of some of the power generating units by reducing the loading which is inevitably caused by power production.

Accordingly, there is a need for a control method which enables the operator or owner to control the operation of the power plant, e.g. with respect to wear and loading of the units, revenue and other power production dependent parameters, and combinations thereof such as revenue in consideration of wear

SUMMARY

It is an object of the invention to improve control of power plants to alleviate one or more of the above mentioned problems, and therefore to provide a method which provides improved In a first aspect of the invention, a method for controlling power generation from a power plant which comprises a plurality of power generating units including at least one wind turbine generator is provided, where the power plant is connected to an electrical power grid for supplying power from the power generating units to the electrical power grid, and where the power plant is controllable to produce power dependent on a power plant reference, the method comprises
  determining a first available power production capability of a selection of one or more power generating units of first priority,
  determining a first power production gap as a difference between the power reference and the first available power production capability,
  determining if the first power production gap is greater or less than zero,
  setting a maximal allowed power production for each power generating unit in a selection of one or more power generating units of second priority to a non-zero value, where the maximal allowed power production is determined dependent on whether the first power production gap is greater or less than zero and dependent on a comparison of the first power production gap with a second available power production capability of the selection of the one or more power generating units of the second priority.

Advantageously, by prioritizing the power generating unit's power production dependent on associated priority levels, the operator of the power generating units is able to optimize the operation of the power plant, e.g. with respect to wear and loading of the units, revenue and other power production dependent parameters, and combinations thereof such as revenue in consideration of wear.

The method may further comprise steps of selecting the one or more power generating units of the first priority and selecting the one or more power generating units of the second priority.

In an example, at least one, such as both, of the selections of power generating units of the first and second priorities, each comprises at least two power generating units.

According to an embodiment, the setting of the maximal allowed power production for each of the one or more power generating units of the second priority comprises,
  if it is determined that the first power production gap is less than zero, then set the maximal allowed power production of the one or more power generating units of the second priority according to their minimum power setpoint, where the minimum power setpoint represents a smallest possible power production setpoint of the power generating unit.

According to an embodiment, the method comprises selecting the one or more power generating units of the first priority and selecting the one or more power generating units of the second priority based on an operational condition of the power generating units.

For example, the operational condition may relate to load histories, estimated or scheduled remaining life time, remaining time to next service and/or other long term conditions, i.e. conditions which do relate to actual short term conditions.

The selections may be performed based on the operational conditions, or based on other factors or in combination with other factors such as power tariff prices per produced power quantity.

Alternatively or additionally, the selections may be performed arbitrarily, e.g. based on user preferences. For example, the operator of the power generating units may determine the selections manually.

According to an embodiment, the selections of the one or more power generating units of the first and the second priorities are maintained for different values of the power plant reference or for variations of the power plant reference.

Advantageously, the prioritizing of the power generating unit's power production is not dependent on the power plant reference, but aims at optimizing the power production over longer terms independent on variations in the power plant reference.

If the power generation units of the first priority are capable of producing the required power, the lower prioritized power generating units could be paused. However, due to wind power changes all the time or changes in incident solar power, this pausing can change to a releasing command at a next moment. These alternating changes between pausing where the power production is zero and releasing where the power production is non-zero lead to increased wear of the power generating units. Advantageously, instead of simply pausing the power generating units, the maximal allowed power productions of the one or more power generating units are set to given technical minimum power setpoints. Accordingly, the power generating units, such as wind turbines, are set in a power production mode, but limited to produce the smallest possible power.

According to an embodiment, the setting of the maximal allowed power production for each of the one or more power generating units of the second priority comprises, if it is determined that the first power production gap is greater than zero, and the second available power production capability is less than the first power production gap, then set the maximal allowed power production of the one or more power generating units of the second priority according to their nominal power setpoints.

Advantageously, if the power generation units of the first priority are not capable of producing the required power and the second available power production capability is also insufficient, the maximal allowed power production of the lower prioritized power generating units are maximized to the nominal power values to maximize the power production of the power generation units of the second priority.

According to an embodiment, the setting of the maximal allowed power production Pmax for each of the one or more power generating units of the second priority comprises, if it is determined that the first power production gap is greater than zero, and the second available power production capability is greater than the first power production gap, then set the maximal allowed power production of the one or more power generating units of the second priority according to a distribution of the first power production gap among the one or more power generating units of the second priority.

Advantageously, if the power generation units of the first priority are not capable of producing the required power, but the second available power production capability is sufficient, the maximal allowed power productions of the lower prioritized power generating units are set according a distribution of remaining power required power production, so that the lower prioritized power generating units produces the remaining required power production, but not more, in order to allow the power generating units of the first priority to maintain the highest possible power production.

According to an embodiment, the distribution of the first power production gap is subject to a constraint specifying that the maximal allowed power production of any one of the one or more power generating units of the second priority cannot be less than the minimum power setpoint.

Advantageously, by ensuring that a distribution of the power production gap does not lead to maximal allowed power productions less than the technical minimum power, it is avoided that any of the power generation units are paused.

According to an embodiment, the method further comprises determining a second power production gap as a difference between the first power production gap and the second available power production capability, determining if the second power production gap is greater or less than zero, setting a maximal allowed power production for each power generating unit in a selection of one or more power generating units of third priority to a non-zero value, where the maximal allowed power production is determined dependent on whether the second power production gap is greater or less than zero and dependent on a comparison of the second power production gap with a third available power production capability of the selection of the one or more power generating units of the third priority.

Advantageously, by prioritizing the power generating unit's power production dependent on a plurality of associated priority levels, the operator of the power generating units is able to optimize the operation of the power plant over several priority levels.

According to an embodiment, the setting of the maximal allowed power production for each of the one or more power generating units of the third priority comprises, if it is determined that the second power production gap is less than zero, then set the maximal allowed power production of the one or more power generating units of the third priority according to their minimum power setpoint, where the minimum power setpoint represents a smallest possible power production setpoint of the power generating unit.

According to an embodiment, the setting of the maximal allowed power production for each of the one or more power generating units of the third priority comprises, if it is determined that the second power production gap is greater than zero, and the third available power production capability is less than the second power production gap, then set the maximal allowed power production of the one or more power generating units of the third priority according to their nominal power setpoints.

Advantageously, if the power generation units of the first and second priorities are not capable of producing the required power and the third available power production capability is also insufficient, the maximal allowed power production of the lower prioritized power generating units are maximized to the nominal power values to maximize the power production of the power generation units of the second priority.

According to an embodiment, the setting of the maximal allowed power production for each of the one or more power generating units of the third priority comprises, if it is determined that the second power production gap is greater than zero, and the third available power production capability is greater than the second power production gap, then set the maximal allowed power production of the one or more power generating units of the third priority according to a distribution of the second power production gap among the one or more power generating units of the third priority.

Advantageously, if the power generation units of the first and second priorities are not capable of producing the required power, but the third available power production capability is sufficient, the maximal allowed power productions of the lower prioritized power generating units are set according a distribution of remaining power required power production, so that the lower prioritized power generating units produces the remaining required power production, but not more, in order to allow the power generating units of the first and second priorities to maintain the highest possible power production.

According to an embodiment, the distribution of the second power production gap is subject to a constraint specifying that the maximal allowed power production of any one of the one or more power generating units of the third priority cannot be less than the minimum power setpoint.

According to an embodiment, the method comprises operating the power generating units with the selection of the one or more power generating units of first priority, the selection of the one or more power generating units of the second priority and optionally the selection of the one or more power generating units of the third priority so that the power production of the one or more power generating units of the first priority is maximized subject to the power plant reference. The maximizing of the power production may comprise determination and dispatch of power setpoints for the individual power generating units to the first priority power generating units.

According to an embodiment, the selection of the one or more power generating units of the first priority, the selection of the one or more power generating units of the second priority and optionally the selection of the one or more power generating units of the third priority are predetermined selections. Advantageously, the priority levels of the power generating units may be determined according to known parameters such as remaining life time, load history, service interval, and other power production related parameters.

According to an embodiment, in case of a communication fault in the communication between a power plant controller and any of the power generating units, the method comprises stopping operating the power generating units according to the method wherein the power production of the one or more power generating units of the first priority is maximized subject to the power plant reference.

Advantageously, by stopping of the determination of maximal power productions based on priority levels, any unreasonable curtailments may be avoided. That is, whenever the central controller loses communications with any of the power generating units, the calculations of the maximal power production values may become inaccurate, so that curtailment decision from this function may become incorrect. In case the priority based procedure is stopped, normal power production control may be invoked.

According, to an embodiment, the method comprises operating the power plant in a curtailed mode where the power reference is less than a nominal plant power.

Further to the above embodiments, the power plant reference, the first, second and optionally the third available power production capabilities and the maximal allowed power production represent active power levels.

A second aspect of the invention relates to a central controller for controlling power production of a power plant which comprises a plurality of power generating units including at least one wind turbine generator, where the power plant is connected to an electrical power grid for supplying power from the power generating units to the electrical power grid, and where at the central controller is arranged to determine a maximal allowed power production and to control the power generating units according to the power plant reference, and where the central controller is arranged to perform the method according to the first aspect.

A third aspect of the invention relates to a power plant which comprises a plurality of power generating units including at least one wind turbine generator and the central controller according to the second aspect.

A fourth aspect of the invention relates to a computer program product comprising software code adapted to control a power plant when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
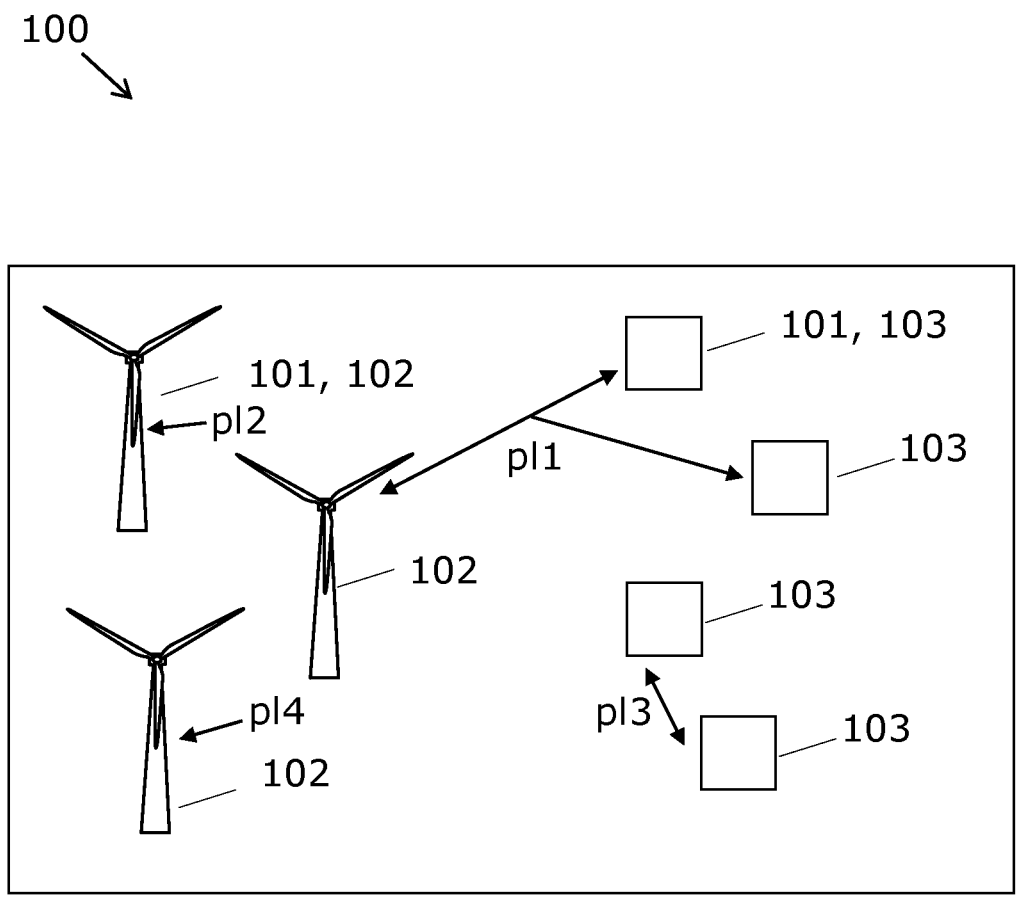
FIG. 1 shows a power plant including a plurality of power generating units and wind turbines.
Figure 1:
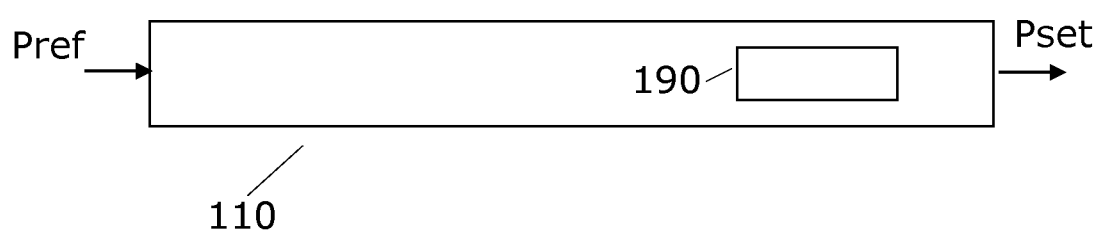

FIG. 1 shows a power plant 100 which comprises a plurality of power generating units 101 such as wind turbines. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines. According to an embodiment, at least one of the power producing units 101 of the power plant 100 is a wind turbine. The power plant 100 may comprise at least three power generating units 101 of the same or different types, i.e. a mix, of different types of power generating units. For example, the power plant 100 may consist only of wind turbines 102 and in this case at least three wind turbines 102, In another example, the power plant 100 comprises at least two wind turbines 102 and at least one or two other power generating units 101.

The power plant is connectable with an electrical power grid (not shown) for supplying power from the power generating units 101 to the electrical power grid.

The power plant 100 is controlled by a central controller 110, The central controller 110 is arranged to control power generation from the power generating units 101 according to a power plant reference Pref which defines the desired power to be supplied to the grid from the power plant 100. Furthermore, the central controller is arranged to dispatch power set-points Pset to the power generating units, i.e. individual power set-points to each power generating unit 101 which sets the desired power productions. The power set-points Pset may be determined by the central controller 110 dependent on the power plant reference Pref so that the sum of power set-points Pset corresponds to the power plant reference Pref.

The central controller 110 may in addition be configured to control the power plant's reactive power production, grid frequency control and/or other functions 190 such as determining maximal allowed power production values Pmax.

Throughout this description, power reference is used for the demanded power for the wind power plant, whereas power set-point is used for the demanded power for the individual power generating units.

Thus, an objective of the central controller 110 comprised by the central controller is to ensure that the demanded power (e.g. from the Transmission System Operator (TSO)) is delivered as fast as possible, this applies both to increases and decreases in the power plant reference, Pref.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exist for other power generating units 101.

Herein any reference to power such as power plant reference Pref, power set points Pset_i, available power Paval_i and other power values can define active, reactive or apparent power levels.

The available power Paval_i of a wind turbine 102 can be determined based on the current wind speed and other parameters limiting the power production. For example, the available power Paval_i may be defined as the maximum possible power output of a wind turbine under the given wind conditions. Thus, the available power will be close to the power output according to the power optimised power curve of a specific turbine. The power curve used herein is understood as the power Coefficient (Cp) optimised power curve for the specific turbine. In other words, the power curve represents the maximum power output of a turbine under normal operation as a function of the wind speed.

As shown in FIG. 1, according to an embodiment, the power generating units 101 may be arranged as selections of one or more power generating units 101 of different priorities. For example, the power generating units 101 may be arranged or grouped into of selection of one or more power generating units 101 of first priority pl1, one or more power generating units 101 of second priority pl2, and optionally one or more selections of power generating units 101 of priorities from three pl3 to optionally four pl4 or higher priority levels pln. In principle, each selection may comprise only one power generating unit 101 so that the number of priorities equals the number of power generating units 101.

Figure 2:
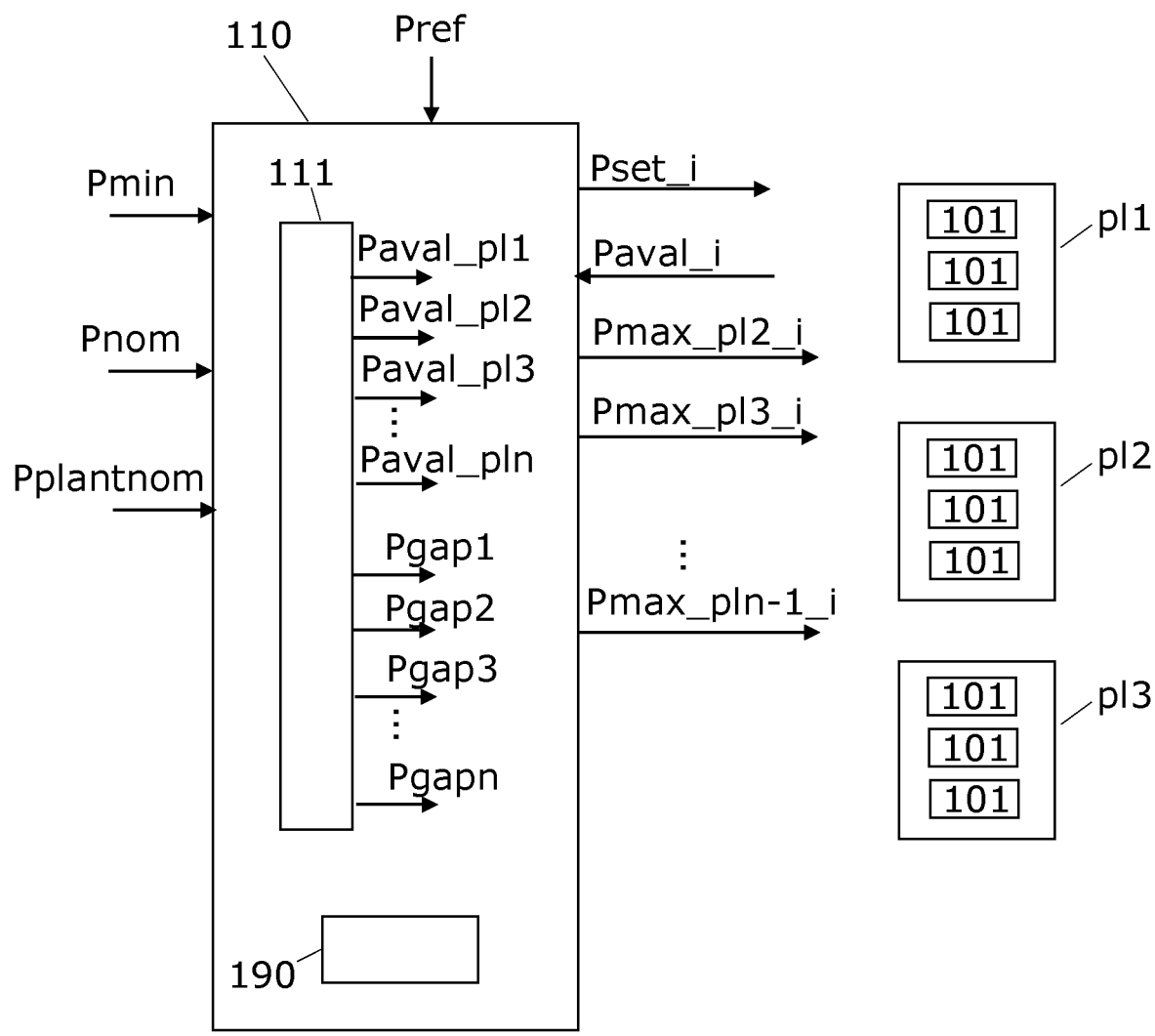
FIG. 2 shows an example of the central controller of the power plant.

FIG. 2 exemplifies the central controller 110 and an arrangement of the power generating units 101 into selections of priorities pl1, pl2, pl3, although the power generating units could be grouped into more priorities levels.

The central controller 110 may be configured to dispatch power setpoints Pset_i to individual power generating units 101, where the power setpoints are used by the power controller of each power generating unit, such as a wind turbine 102, for controlling the generation of power according to the supplied power setpoint. The power setpoints Pset_i may be determined based on the power reference Pref and possibly other input signals such as the available power of the individual power generating units Paval_i.

For a wind turbine 102, the available power Paval_i is the power available from a wind turbine 102 at the given time, calculated based on the current wind speed and other parameters limiting the power production. For other power generating units such as photovoltaic solar panels, the available power Paval_i may be determined based on the incident solar power and performance characteristics of the solar panels.

The central controller 110 is configured to determine the available power production capability Paval_pl1, Paval_pl2, ... Paval_pln, of selections of one or more power generating units 101 of different priorities ranging from the first priority pl1, to one or more higher priorities pl2, ... , pln. The available power production capability Paval_plx of a given selection of power generating unit 101 is determined based on the available power Paval_i of individual power generating units, e.g. by summing the available power Paval_i of units 101 of a given priority group pl1, ... pln.

The central controller 110 is further configured to determine maximal allowed power production values Pmax for each power generating unit 101 in one or more selections of generating units 101 of second or higher priorities pl2, ... , pln. The maximal allowed power production values Pmax may be provided as individual power levels for each power generating unit, or may be a common power level for two or more power generating units. For example, maximal allowed power production values Pmax_pl2_i may be determined for individual power generating units of the selection of units 101 of priority pl2. The maximal allowed power production values Pmax are determined dependent on power production gaps Pgap1, ... , Pgapn and the available power production capabilities Paval_pl2, ... , Paval_pln of selections of power generating units 101 of the second or higher priorities pl2, ... , pln, as described in detail elsewhere.

The power generating units 101 have associated nominal power specifications Pnom which specify a maximal power level that the power generating unit 101 is capable of producing, a maximal power production limit, a recommended power production limit or other specification of nominal power setpoints Pnom. The nominal power setpoints Pnom may be provided as individual power levels for each power generating unit, or may be a common power level for two or more power generating units The power production of each power generating unit 101 may be constrained according to minimum power setpoints Pmin. The minimum power setpoints Pmin may be provided as individual power levels for each power generating unit, or may be a common power level for two or more power generating units. For a wind turbine 102, the minimum power setpoint Pmin may be given from the power production specification, i.e. the minimum power setpoint is defined by the minimum power production capability, or other defined minimum power limits such as user defined power limits. For a solar panels, the minimum power setpoint may be defined according to the specifications of the solar panel. Thus, the minimum power setpoint Pmin represents the smallest possible power production set-point of a power generating unit 101.

Accordingly, the maximal allowed power production specification Pmax of a power generating unit 101 can at least be set to the nominal power setpoint Pnom and the minimum power setpoint Pmin.

The selections of the power generating units 101 of the first, second and/or higher priorities pl1, pl2, ... , pln may be predetermined selections, or may be selected according to rules. For example, the priority settings of the power generating units may be performed according to load histories, estimated or scheduled remaining life time, remaining time to next service, power tariff prices per produced power quantity, including combinations thereof. For example, if a number of power generating units have a high accumulated load, but a relative long time to the next service, they may be given a low priority in order to limit additional loads. A power generating unit having a low scheduled remaining life time, but otherwise performs satisfactorily, may be given a high priority. Power generating units having a high tariff price may be given a high priority in order to maximize operation revenue.

As long as changes of the conditions (such as remaining life time or any other conditions mentioned above) for determining the selections would not result in a change of the selections of power generating units, i.e. the grouping into different priorities, the selections may be maintained. Alternatively, if the selections are predetermined, e.g. determined by the operator, the selections may be maintained as long as desired. Accordingly, the selections may be maintained irrespective of the power plant reference or the power produced by the power generating units.

The priority levels pl1, . . . , pln prioritizes the power generating units with respect to their active power productions. Thus, the power production of the one or more power generating units 101 of the first priority pl1 is prioritized over lower priorities pl2, . . . , pln. For example, the power generation of the power generating units of the first priority pl1 may be maximized subject to the power plant reference Pref, i.e. so that they are controlled to produce as much power as possible, while lower prioritized power generating units are controlled to produce remaining power, which may not be produced by the first priority units 101, by curtailing or pausing these lower prioritized units. Thus, the one or more power generating units 101 of the first priority pl1 may be operated to produce a maximal power up to the power plant reference Pref.

Additionally, the priorities associated with selections of power generating units may used for prioritizing the releasing and pausing of power generating units 101, such as wind turbines 102, during the operation where the maximal allowed power production Pmax are determined according to the priorities pl1, . . . pln. Accordingly, the power generating unit 101 with highest priority, i.e. a power generating unit of the selection of units 101 of first priority pl1, may be released first and paused at the latest, if needed. Oppositely, a power generating unit 101 of a selection of units 101 of lowest priority, e.g. third priority pl3, may be released latest and paused at the earliest, if needed.

The power plant 100 is characterized by a nominal plant power Pplantnom, being the nominal power production capability. The power plant 100 may be operated in a curtailed mode where the power reference Pref is less than a nominal plant power Pplantnom.

Figure 3:
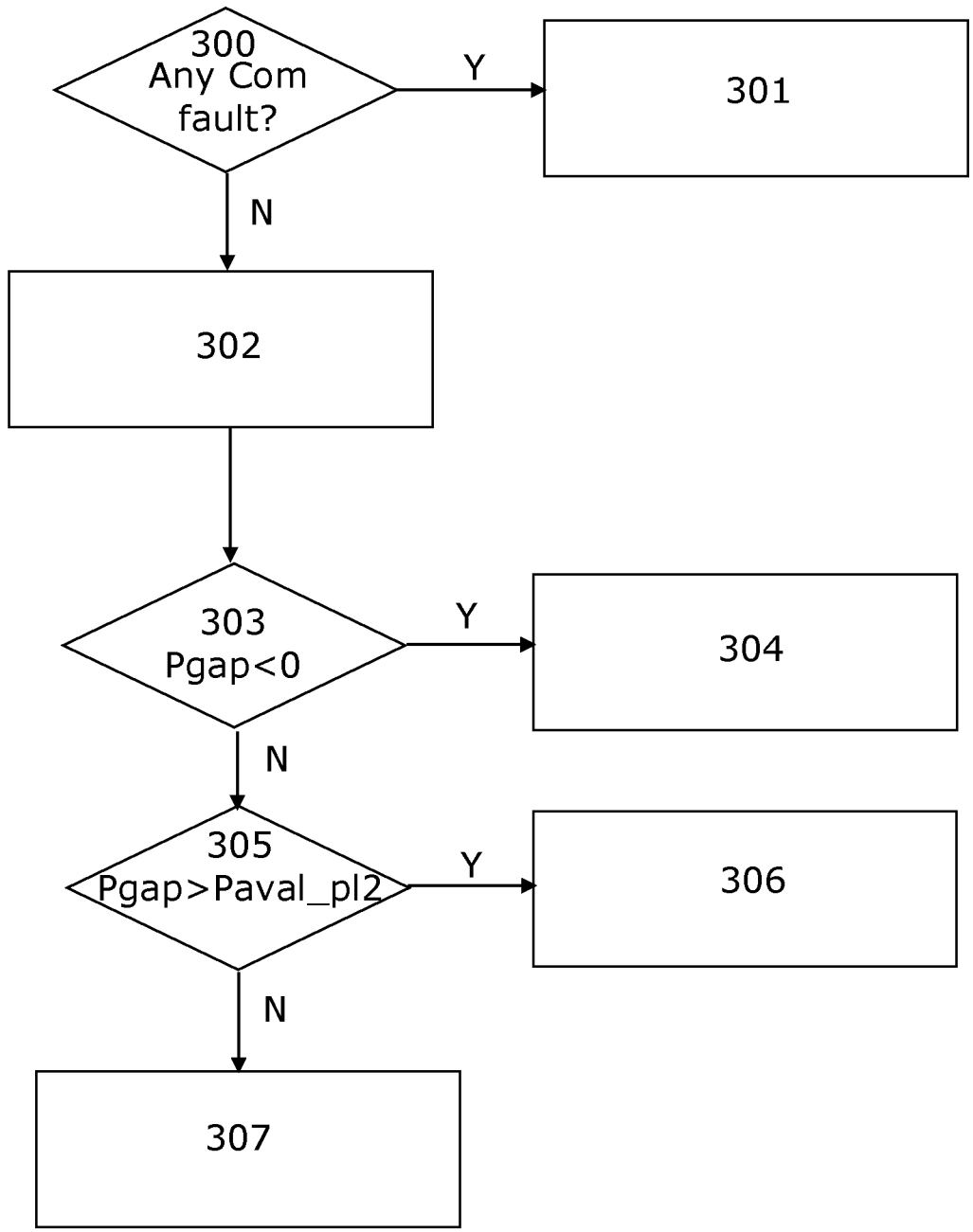
FIG. 3 illustrates a flowchart for various embodiments of the invention.

FIG. 3 illustrates various embodiments of the invention:

In step 300, it is initially determined if there is a communication fault in the communication between a power plant controller 110 and any of the power generating units 101.

In step 301, if there is a communication fault, the operation of the power generating units 101 so that the power production of power generating units 101 of the first priority pl1 is maximized subject to the power plant reference Pref is stopped.

In step 302, if there is no communication fault, the power generating units of the first priority pl1 are controlled to produce as much power as possible, up to the power plant reference Pref.

Further in step 302, the first available power production capability Paval_pl1 of the selection of power generating units of the first priority pl1 is determined. Furthermore, the first power production gap Pgap1 is determined as the difference between the power reference Pref and the first available power production capability Paval_pl1, i.e. Pref−Paval_pl1.

In step 303 it is determined if the first power production gap Pgap1 is greater or less than zero. For convenience and simplicity of the explanation, the case where Pgap is equal to zero is included either in the "greater than" or "less than" decision.

In step 304, if it is determined that the first power production gap Pgap1 is less than zero, or less than or equal to zero, meaning that the power generating units of the first priority pl1 are fully capable of producing power according to the power plant reference Pref, then the maximal allowed power production Pmax of the one or more power generating units 101 of the second priority pl2 is set to a minimum power setpoint Pmin, i.e. the minimum power setpoint Pmin associated with individual power generating units, where the setpoints Pmin may be different for different power generating units.

Further in step 304, if there are selections of power generating units 101 having priorities lower than the second priority pl2, such as third and fourth priorities pl3, pl4, then the maximal allowed power production Pmax of power generating units of these lower prioritized selections of power generating units 101 are also set to the minimum power setpoint Pmin.

In step 305, it is determined if the first power production gap Pgap1 is greater than zero, and the second available power production capability Paval_pl2 is less than the first power production gap Pgap1, i.e. Paval_pl2<Pgap1, meaning that the available power of the second priority selection is insufficient for the remaining power requirement.

In step 306, if step 305 is answered with a yes, the maximal allowed power production Pmax of the power generating units 101 of the second priority pl2 are set to the nominal power setpoints Pnom in order to allow the second priority power generating units to produce as much power as possible. Again, different power generating units may have different nominal power setpoints.

In step 307, if step 305 is answered with a no, because the second available power production capability Paval_pl2 is greater than the first power production gap Pgap1, meaning that the available power production capability of the second priority selection is sufficient for the remaining power requirement, the maximal allowed power production Pmax of the power generating units 101 of the second priority pl2 is set according to a distribution of the first power production gap Pgap1 among the power generating units 101 of the second priority pl2. For example, Pgap1 may be equally divided among the power generating units of the second priority. In another example, the first power gap Pgap1 may be distributed dependent on the available power production capabilities Paval_i of individual power generating units, e.g. according to the relationship of the individual available power production capabilities different power generating unit's of the second priority pl2 with the first power gap Pgap 1, e.g. determined according to ratios Paval_i/Pgap1. Accordingly, power generating units 100 having the highest available power production capabilities Paval_pl2 may be provided with higher power production levels Pmax than power generating units 100 having the lowest available power production capabilities Paval_pl2. The examples of distributing the first power gap Pgap1 applies equivalently to the distribution of other power gaps Pgap2, . . . Pgapn.

The distribution of the of first power production gap Pgap1 among the power generating units 101 could in some situation imply that Pmax for one or more of the power generating units is set to value lower than Pmin, which is undesired, To avoid this, the distribution of the first power production gap Pgap1 may be performed so that the maximal allowed power production Pmax of any one of the one or more power generating units 101 of the second priority pl2 cannot be less than the minimum power setpoint Pmin.

Thus, in general, steps 302-307 provides a method wherein a maximal allowed power production Pmax is set to a non-zero value for each power generating unit in a selection of one or more power generating units 101 of second priority pl2, where the maximal allowed power production Pmax is determined dependent on whether the first power production gap Pgap1 is greater or less than zero and dependent on a comparison of the first power production gap Pgap1 with a second available power production capability Paval_pl2 of the selection of the one or more power generating units 101 of the second priority pl2.

In case the power plant 100 comprises a selection of power generating units of third priority pl3, a second power production gap Pgap2 is determined as a difference between the first power production gap Pgap1 and the second available power production capability Paval_pl2, and it is determined if the second power production gap Pgap2 is greater or less than zero.

If it is determined that the second power production gap Pgap2 is less than zero, then the maximal allowed power production Pmax of the one or more power generating units 101 of the third priority pl3 are according to their minimum power setpoint Pmin. This follows the example in step 304, when there are selections of power generating units with priorities lower than pl2 and Pgap 1 is less than zero. Accordingly, it this case the determination of the second power production gap Pgap2 is not required since when Pgap1<0 if follows that also Pgap2<0.

Further in step 306, when the power plant 100 comprises a selection of power generating units of third priority pl3, since the available power Paval_pl2 of power generating units of the second priority pl2 is insufficient for satisfying the first power production gap Pgap1, the determined second power production gap Pgap2 will be greater than zero.

Further in step 306, if it is determined if the third available power production capability Paval_pl3 is less than the second power production gap Pgap2, meaning that the available power production capability of the third priority selection pl3 is insufficient for the remaining power requirement, the maximal allowed power production Pmax of the one or more power generating units 101 of the third priority pl3 are set to the nominal power setpoints Pnom.

Further in step 306, if it is determined that the third available power production capability Paval_pl3 is greater than the second power production gap Pgap2, meaning that the available power production capability of the third priority selection pl3 is sufficient for the remaining power requirement, the maximal allowed power production Pmax of the one or more power generating units 101 of the third priority pl3 are determined according to a distribution of the second power production gap Pgap2 among the one or more power generating units 101 of the third priority pl3.

Further in step 307, when the power plant 100 comprises a selection of power generating units of third priority pl3, since the available power Paval_pl2 of power generating units of the second priority pl2 is sufficient for satisfying the first power production gap Pgap1, the determined second power production gap Pgap2 will be less than zero. Then the maximal allowed power production Pmax of the one or more power generating units 101 of the third priority pl3 are set according to their minimum power setpoint Pmin.

The determination of the maximal allowed power production Pmax, in situations where the wind turbine park comprises selections of power generating units 101 of priority pl4 or lower priorities up to pln, follows the above principles.

Thus, in general, the above described principles for determining the maximal allowed power production Pmax in a situation where the power generating units comprises selections of power generating units of third priority pl3 or lower priorities, provides a method wherein a maximal allowed power production Pmax is set to a non-zero value for each power generating unit in a selection of one or more power generating units 101 of third priority pl3 or lower priorities pl4, ..., pln, where the maximal allowed power production Pmax is determined dependent on whether the relevant power production gap Pgap2, ... Pgapn is greater or less than zero and dependent on a comparison of the power production gap with an available power production capability Paval_pl3, ... Paval_pln of the selection of the one or more power generating units.

The central controller may be configured so that the maximal allowed power production values Pmax of one or more of the power generating units may be set according to other user preferences, or may be set according to user determined maximal allowed power production values Pmax, irrespective of priorities pl1, ..., pln associated with the power generating unit of interest.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling power generation from a power plant which comprises a plurality of power generating units including at least one wind turbine generator, where the power plant is connected to an electrical power grid for supplying power from the power generating units to the electrical power grid, and where the power plant is controllable to produce power dependent on a power plant reference, the method comprising:
   determining a first available power production capability of a selection of one or more power generating units of a first priority;
   determining a first power production gap as a difference between the power plant reference and the first available power production capability;
   determining if the first power production gap is greater or less than zero;
   setting a maximal allowed power production for each power generating unit in a selection of one or more power generating units of a second priority to a non-zero value, where the maximal allowed power production is determined dependent on whether the first power production gap is greater or less than zero and dependent on a comparison of the first power production gap with a second available power production capability of the selection of the one or more power generating units of the second priority; and
   controlling the one or more power generating units of the second priority based on the maximal allowed power production.

2. The method of claim 1, wherein setting the maximal allowed power production for each of the one or more power generating units of the second priority comprises:
   if it is determined that the first power production gap is less than zero, setting the maximal allowed power production of the one or more power generating units of the second priority according to their minimum power setpoint, where the minimum power setpoint represents a smallest possible power production setpoint of the power generating unit.

3. The method of claim 1, further comprising selecting the one or more power generating units of the first priority and selecting the one or more power generating units of the second priority based on an operational condition of the power generating units.

4. The method of claim 1, further comprising maintaining the selections of the one or more power generating units of the first and the second priorities for different values of the power plant reference or for variations in the power plant reference.

5. The method of claim 1, wherein setting the maximal allowed power production for each of the one or more power generating units of the second priority comprises:
if it is determined that the first power production gap is greater than zero and the second available power production capability is less than the first power production gap, setting the maximal allowed power production of the one or more power generating units of the second priority according to their nominal power setpoints.

6. The method of claim 1, wherein setting the maximal allowed power production for each of the one or more power generating units of the second priority comprises:
if it is determined that the first power production gap is greater than zero and the second available power production capability is greater than the first power production gap, setting the maximal allowed power production of the one or more power generating units of the second priority according to a distribution of the first power production gap among the one or more power generating units of the second priority.

7. The method of claim 6, wherein the distribution of the first power production gap is subject to a constraint specifying that the maximal allowed power production of any one of the one or more power generating units of the second priority cannot be less than the minimum power setpoint.

8. The method of claim 1, further comprising:
determining a second power production gap as a difference between the first power production gap and the second available power production capability;
determining if the second power production gap is greater or less than zero; and
setting a maximal allowed power production for each power generating unit in a selection of one or more power generating units of a third priority to a non-zero value, where the maximal allowed power production is determined dependent on whether the second power production gap is greater or less than zero and dependent on a comparison of the second power production gap with a third available power production capability of the selection of the one or more power generating units of the third priority.

9. The method of claim 8, wherein the setting the maximal allowed power production for each of the one or more power generating units of the third priority comprises:
if it is determined that the second power production gap is less than zero, setting the maximal allowed power production of the one or more power generating units of the third priority according to their minimum power setpoint, where the minimum power setpoint represents a smallest possible power production set-point of the power generating unit.

10. The method of claim 8, wherein setting the maximal allowed power production for each of the one or more power generating units of the third priority comprises:
if it is determined that the second power production gap is greater than zero and the third available power production capability is less than the second power production gap, setting the maximal allowed power production of the one or more power generating units of the third priority according to their nominal power setpoints.

11. The method of claim 8, wherein setting the maximal allowed power production for each of one or more power generating units of the third priority comprises:
if it is determined that the second power production gap is greater than zero and the third available power production capability is greater than the second power production gap, setting the maximal allowed power production of the one or more power generating units of the third priority according to a distribution of the second power production gap among the one or more power generating units of the third priority.

12. The method of claim 11, wherein the distribution of the second power production gap is subject to a constraint specifying that the maximal allowed power production of any one of the one or more power generating units of the third priority cannot be less than the minimum power setpoint.

13. The method of claim 1, comprising operating the power generating units with the selection of the one or more power generating units of the first priority and the selection of the one or more power generating units of the second priority so that the power production of the one or more power generating units of the first priority is maximized subject to the power plant reference.

14. The method of claim 1, wherein the selection of the one or more power generating units of the first priority and the selection of the one or more power generating units of the second priority are predetermined selections.

15. The method of claim 1, comprising, in case of a communication fault in the communication between a power plant controller and any of the power generating units, stop operating the power generating units according to the method, wherein the power production of the one or more power generating units of the first priority is maximized subject to the power plant reference.

16. The method of claim 1, comprising operating the power plant in a curtailed mode where the power reference is less than a nominal plant power.

17. A central controller for controlling power production of a power plant which comprises a plurality of power generating units including at least one wind turbine generator, where the power plant is connected to an electrical power grid for supplying power from the power generating units to the electrical power grid, and where at the central controller is arranged to determine a maximal allowed power production and to control the power generating units according to the power plant reference, and where the central controller is configured to perform an operation comprising:
determining a first available power production capability of a selection of one or more power generating units of a first priority;
determining a first power production gap as a difference between the power plant reference and the first available power production capability;
determining if the first power production gap is greater or less than zero; and setting a maximal allowed power production for each power generating unit in a selection of one or more power generating units of a second priority to a non-zero value, where the maximal allowed power production is determined dependent on whether the first power production gap is greater or less than zero and dependent on a comparison of the first power production gap with a second available power production capability of the selection of the one or more power generating units of the second priority; and controlling the one or more power generating units of the second priority based on the maximal allowed power production.

\* \* \* \* \*